(12) United States Patent
Dunner

(10) Patent No.: US 7,036,409 B2
(45) Date of Patent: May 2, 2006

(54) SPRING COLLET FOR MACHINE TOOLS

(75) Inventor: Daniel Dunner, Moutier (CH)

(73) Assignee: Walter Dunner S.A., Moutier (CH)

( * ) Notice: Subject to any disclaimer, the term of this patent is extended or adjusted under 35 U.S.C. 154(b) by 0 days.

(21) Appl. No.: 10/990,179

(22) Filed: Nov. 15, 2004

(65) Prior Publication Data

US 2005/0087936 A1    Apr. 28, 2005

Related U.S. Application Data

(63) Continuation of application No. PCT/IL03/00406, filed on May 19, 2003.

(30) Foreign Application Priority Data

May 21, 2002    (CH)    ............... 2002/084502

(51) Int. Cl.
*B23B 31/20*    (2006.01)
(52) U.S. Cl. .............. 82/162; 279/43; 279/50; 279/46.3
(58) Field of Classification Search .......... 279/43, 279/43.2, 43.4, 50, 46.3; 82/162
See application file for complete search history.

(56) References Cited

U.S. PATENT DOCUMENTS

| 232,311 | A | * | 9/1880 | Starr ........................ 279/50 |
| 2,438,797 | A | | 3/1948 | Bagge |
| 2,475,519 | A | | 7/1949 | Robichaud |
| 2,550,036 | A | * | 4/1951 | Bechler ....................... 279/43 |
| 3,121,572 | A | * | 2/1964 | Torok ......................... 279/50 |
| 3,874,688 | A | | 4/1975 | Schiller |
| 6,508,475 | B1 | * | 1/2003 | Strodtman et al. ......... 279/46.3 |

FOREIGN PATENT DOCUMENTS

| DE | 434 583 A | | 9/1926 |
| DE | 974 660 A | | 7/1949 |
| DE | 3006476 | * | 9/1981 |
| DE | 3630808 | * | 3/1988 |
| FR | 1019344 A | | 1/1953 |
| JP | 01-11701 A | | 1/1989 |
| JP | 4-53606 | * | 2/1992 |
| JP | 8-229714 | * | 9/1996 |
| JP | 2000-158216 | * | 6/2000 |
| JP | 2001-322014 | * | 11/2001 |

* cited by examiner

*Primary Examiner*—Daniel W. Howell
(74) *Attorney, Agent, or Firm*—Frishauf, Holtz, Goodman & Chick, P.C.

(57) ABSTRACT

In a spindle assembly for machine tools, the axial length λ of the collar of a spring collet is determined as a function of the axial course length c of a clamping sleeve operating spring collet. This axial length λ is preferably retained within an interval ranging between 3 mm and 9 mm. A tapering surface of the collar presents an inclined profile, which is straight, curved, or at least partially curved. The angle of inclination formed by the tapering surface with the axis of the spring collet is advantageously of the order of 45°. The spring collet has at least two grooves. The gap between these grooves may be determined in such a way that, when the spring collet is in the closed position, then the workpiece is gripped with a predetermined clamping force, and the two mutually opposing faces of each groove portion abut against each other.

15 Claims, 2 Drawing Sheets

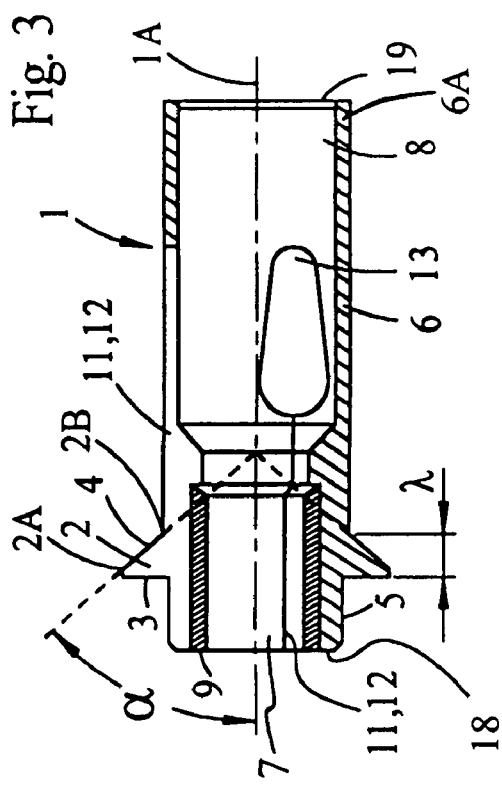
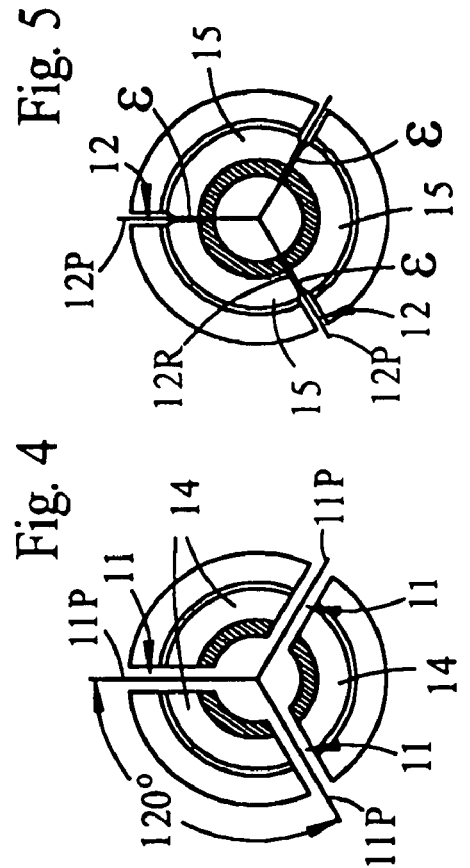
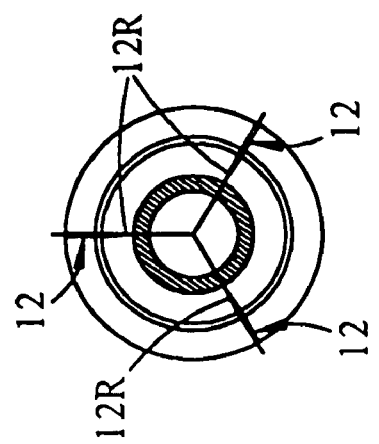
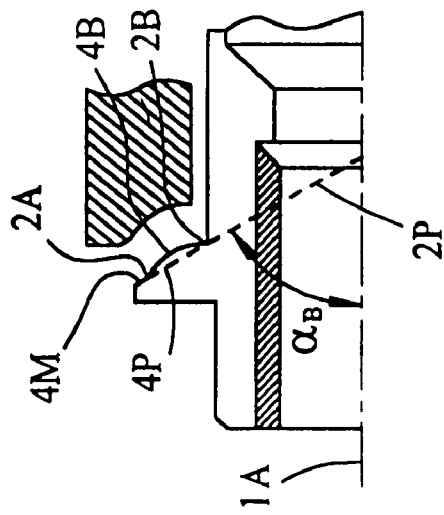
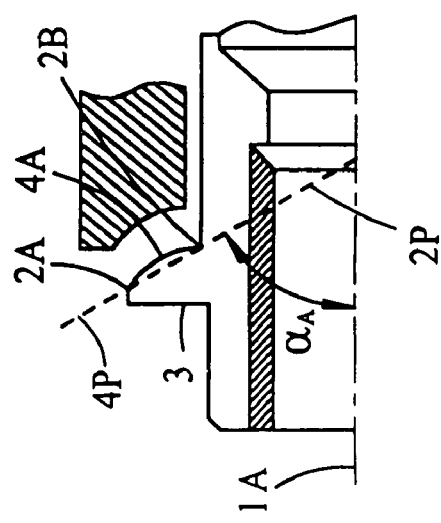

SPRING COLLET FOR MACHINE TOOLS

This application is a Continuation Application of International Application PCT/IL03/00406 filed May 19, 2003.

TECHNICAL FIELD

The present invention relates to spindle assemblies for machine tools, namely for automatic lathes, and in particular, to a spring collet for use with spindle assemblies.

DISCLOSURE

The user of a machine tool for the production of high-precision parts, possesses an entire set of existing collets from which he will select one for mounting, for example, within a rework spindle or within an indexing attachment. The selected existing collet is chosen with a diameter suitable to that of the small workpiece to be machined (with a diameter ranging approximately from 1 mm to 10 mm). When closed, the clamping jaws are able to grip the diameter of the workpiece as long as there is a gap between the mutually opposing faces of each groove. As known from the prior art, existing collets, operating in spindle assemblies of machine tools, usually have three grooves that form the clamping jaws for retaining and releasing a workpiece. The portion with the grooves has the shape of a truncated cone that is relatively long, namely with the cone having a vertex angle of the order of 30°.

The problem is that existing collets, used for the production of high-accuracy small machine parts, are subject to a double disadvantage, in view of the diversity of workpieces for the machining of which they are used.

In a first instance, or first problem, various diameters have often to be machined along the length of the workpiece. With existing collets for machining small precision parts, the difference between the diameters of the variable opening of these collets when in the open position (maximum opening) and in the closed position (that is, clamped onto the workpiece), is very small, namely of the order of 0.30 mm in the best case, which is often smaller than the difference between the diameters to be processed on the workpiece. Accordingly, with a workpiece which has a general diameter D, and presents a diameter of D+0.40 mm over a certain portion of its length, there is selected an appropriate existing collet for the diameter D. However, when the clamping jaws of the selected existing collet (which is intended to clamp a workpiece of diameter D) are in the maximum opening position, thus at opening diameter D+0.30, the passage of the workpiece, with maximum diameter of D+0.40 mm is evidently hindered. In such a first instance situation, it is necessary to proceed in several successive machining stages to perform the machining of the workpiece along its entire length. This may involve, for example, reworking the workpiece by means of an adaptation sleeve, counter-operations, etc., all resulting in a considerable increase of manufacturing costs, since equipment for the production of small high-precision parts is presently configured to tolerate a difference between the diameters of the variable opening of 0.30 mm at most.

In a second instance, or second problem, manufacturers are often confronted with the risk of crushing the workpiece when it is clamped in an existing collet. This is due to specific parameters which characterize the workpiece or which relate to the machining data, amongst others: workpiece made of relatively soft material, clamping on a screw thread, thin walls, workpiece in tubular form, diameter of the workpiece at the clamping location, force applied to the workpiece by the cutting tool. The means presently used in order to limit the clamping force (such as the machining of a limit stop at a certain point, in view of limiting the course of the sleeve within which the collet is disposed) are quite unsatisfactory. This second instance inability to control the clamping force is another source of increased manufacturing costs, causing a large number of rejects and providing rather inconsistent machining quality.

It is an object of the embodiments of the present invention to provide a spring collet for use within the spindle of existing and of new machine tools, for high-precision machining of small parts that overcomes the two disadvantages, or problems described above. That is, for example, the too limited range of diameters of the variable central axial opening of all the existing collets in a set, and the risk of crushing portions of the workpiece or, at the very least, to surmount one or the other of both problems, according to the type of workpiece to be machined, when either one or both of these disadvantages is present.

As a solution to the problems mentioned above, a spring collet is designed, to be mounted within the spindle of a machine tool in replacement of an existing collet. The problem-solving spring collet permits machining of small high-precision cylindrical workpieces with a wider range of diameters than the existing collets, for a broad variety of applications. By way of illustration only, the spring collet may be used for the machining of shafts for prostheses used in osteopathy, or shafts for micro-motors. The front end of the spring collet has a portion shaped as a truncated cone extended by a nose and presents, along a defined length, at least two grooves opening onto the front end, forming at least two clamping jaws around the variable central axial opening, enabling the clamping of the workpiece to be machined, so that the plane of symmetry of each groove passes through the axis of rotation of the spring collet.

To this end there is provided a spring collet with a particularly dimensioned collar. A tapering surface of the collar, in the general shape of a truncated cone, has a maximal collar root width, defined as an axial length $\lambda$, which is selected as a function of an interval limited by specific multiples of the axial course length c. That axial course length c is the length of translation of the clamping sleeve of the spindle operating on the spring collet to clamp or release the workpiece. The function defines that the axial length $\lambda$ is to be retained within the interval limited by about twice and five times the axial course length c. Furthermore, the angle between the tapering surface of the collar and the axis of the spring collet is chosen to be greater than 15°, and preferably, about 45°.

BACKGROUND ART

Seidemann, Shoenenberger in German Patent No. 974,660, Suganurna, and Robichaud fail to mention a particular spring collet with a collar designed for widening the range of small workpiece diameters able to be processed at high-precision in one manufacturing step, and also fail to mention the use of only but the spring collet itself for limiting the clamping force applied to the workpiece when gripped. The prior art thus does not disclose, teach, or suggest neither the spring collet nor the embodiments of the present invention.

The embodiments of the present invention deal with a distinct structure for a particular spring collet, for use with small parts high-precision manufacturing, operative in replacement of existing collets present in a variety of spindles pertaining to machine tools, namely turning lathes and indexing devices, and providing either one and both wider workpiece diameter single-pass processing capability and workpiece clamping force control.

A spring collet openable and adaptable to a wide range of workpiece diameters was always desired in the uppermost high-precision industry, but expectations were delayed until a solution was found for the practical implementation as a suitable product. Presently, the spring collet is openly approved by the experts and well received on the market.

SUMMARY

It is an object of the present invention to provide a spring collet for use within a spindle assembly of machine tools, and particularly for automatic lathes. The spring collet has an axis and concentrically aligned thereto, a variable central axial opening adjustable to a first open position and to a second closed position, for respectively, releasing and clamping a workpiece. The spring collet has at least two grooves, where each one of the two grooves has two mutually opposite faces, and a collar extending concentrically outward from the spring collet, and having a tapering surface against which rests a corresponding face of a sleeve. The sleeve is operable for translating forth and back along a limited axial course length c, to reversibly dispose the opening, respectively, in the open and in the closed position. The spring collet comprises an axial length $\lambda$ of the collar being retained within a length interval whose lower and upper limits are about, respectively, twice and five times the axial course length c, and the tapering surface being inclined by more than 15° relative to the axis of the spring collet.

One embodiment of the present invention provides a spring collet wherein the axial length $\lambda$ of the collar is selected within an interval ranging between approximately 2 mm and 15 mm, and the length of the axial course c is retained between, approximately 1 mm and 3 mm. In another embodiment, the axial length $\lambda$ of the collar is possibly selected within an interval ranging between approximately 3 mm and 9 mm, and the length of the axial course is retained between, approximately 1.5 mm and 1.8 mm.

It is a further object of the present invention to provide a spring collet wherein the tapering surface of the collar is inclined by some 45° relative to the axis of the spring collet, and if desired, the tapering surface of the collar has a profile that is selected from the group of profiles consisting of a straight profile, a curved profile, and an at least partially curved profile.

It is another object of the present invention to provide a spring collet wherein the spring collet has more than three grooves, and the difference in diameter between the open and the closed position of the variable central axial opening is greater than 0.30 mm.

It is yet another object of the present invention to provide a spring collet wherein the spring collet has at least a portion of two mutually opposite faces of the at least two grooves that abut against each other when the spring collet is in the closed position and grips the workpiece with a predetermined clamping force.

BRIEF DESCRIPTION OF THE DRAWINGS

In order to understand the invention and to see how it may be carried out in practice, preferred embodiments will now be described, by way of non-limiting example only, with reference to the accompanying drawings, in which:

FIG. 3 is an axial longitudinal section of the spring collet only, FIG. 4 is a front view of the spring collet (in open position), showing the grooves according to one embodiment, FIGS. 5 and 6 are front views of the spring collet (in closed position), showing the form of the grooves according to another embodiment, and FIGS. 7 and 8 show profile variants of an element of the spring collet.

It is noted that the scale of representation of the various Figures is not uniform.

DETAILED DESCRIPTION OF THE INVENTION

Figure 1:
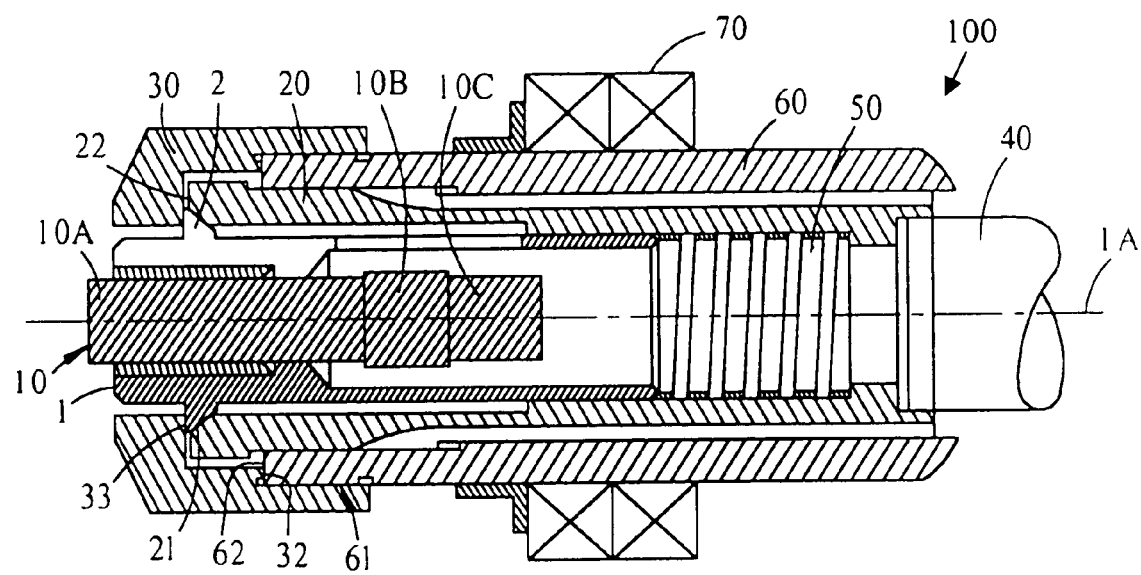
FIG. 1 is an axial longitudinal section of an assembly within which the spring collet is mounted, the spring collet being shown in closed position.
Figure 2:
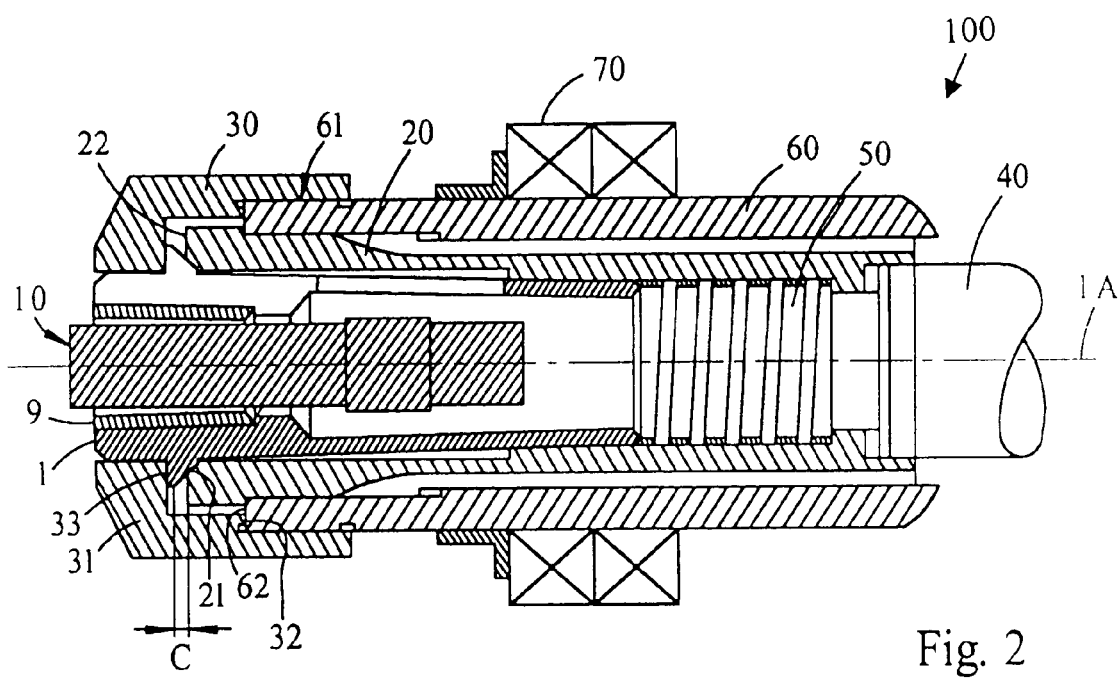
FIG. 2 is an axial longitudinal section similar to that shown in FIG. 1, the spring collet being shown in open position.

FIGS. 1 and 2 show a spring collet 1 integrated within a spindle assembly 100, which is part of a rework spindle, including a clamping sleeve 20 connected to a clamping piston 40, on the right of the Figs., indicating the rear, that is, rearward of the spring collet 1, a fixed sleeve 60 on which are mounted roller bearings 70, a clamping nut 30, on the left of the Figs., indicating the front, that is, to the front with the spring collet 1, and an elastic organ 50. The elastic organ 50 rests, on one side, against a face (not shown) of the sleeve 20 and, on the other side, against the rear face 19 (shown in FIG. 3) of the spring collet 1. After introducing the spring collet 1 into the spindle assembly 100, the nut 30 is screwed onto a threaded portion 61 of the sleeve 60. A collar 2 of the spring collet 1 is caught between an interior face 33 of a corner 31 of the nut 30 and a front face 21 of the sleeve 20, and an interior face 32 of said nut 30 abuts against a front face 62 of the sleeve 60. Thereby, the spring collet 1 constitutes an integral portion of the spindle assembly 100.

The spring collet 1, with a central longitudinal axis designated as 1A in the figures, is generally tubular in form, in the sense that it consists of a hollow body forming a hollow internal space, as represented in an axial section, and in a closed position, in FIG. 3. According to the example shown, and extending radially outward from the collar 2 that has a frusto-conical shape, there is a base 3 (oriented toward the front) and a lateral tapering surface 4, with respectively, on one side a nose 5, and on the other side, a span 6. A rear portion 6A of the span 6 remains guided by the clamping sleeve 20 (see also FIGS. 1 and 2). The outside diameter of the span 6 extends, according to the construction thereof, over a range of several millimeters, more or less, like the diameter of the nose 5. The hollow internal space is essentially composed of a variable central axial opening 7 and a relief 8. The periphery of the variable central axial opening 7 is provided, according to the example, with a carbide insert 9, which is applied to the workpiece 10 (FIGS. 1 and 2). The spring collet 1, according to the example, has three blind grooves 11; 12, where the grooves 11 (FIG. 4) and 12 (FIGS. 5 and 6) correspond respectively to two different embodiments. Each pair of median planes 11 P; 12 P of the grooves 11; 12 forms an angle of 120° (shown only once, in FIG. 4). These grooves 11; 12 open, to the front, onto a face 18 of the spring collet 1 and end in the formation of three clamping jaws 14; 15—or, more generally, of as many clamping jaws as there are grooves, whereby the clamping jaws are capable of opening and of closing by virtue of their elasticity. At the opposite end, the grooves 11; 12 open into hollows 13, which enable improved elasticity.

Returning to FIGS. 1 and 2, it is understood that, when the piston 40 is withdrawn backward to the rear, the spring collet 1 opens and the clamping jaws 14; 15 open radially outward and away from the axis 1A of the spring collet 1, releasing the workpiece 10, while, as described above, the spring collet 1 remains retained between the nut 30 and the sleeve 20. Meanwhile, the elastic organ 50 exercises a force capable of retaining the collar 2 against the internal face 33 of the corner 31 of the clamping nut 30. When the clamping jaws 14; 15 are open, the tapering surface 4 of the collar 2 abuts against the front face 21 of the clamping sleeve 20. The face 21, which matches with the tapering surface 4, as shown in the example depicted in FIGS. 1, 2 and 3, is itself tapered and presents the same conicity as the tapering surface 4.

When the spring collet 1 passes from the open position (FIG. 2) to the closed position (FIG. 1) (or vice versa), the sleeve 20 translates forward (or backward) along a limited axial course length designated in FIG. 2 by the letter c (translation of the front face 22 that is perpendicular to the axis 1A). This axial course length c is a function of the characteristics of the machine tool within the spindle wherein the spring collet is mounted, it being noted that, in practice, the most customary values for the axial course length c run between approximately 1 mm and 3 mm.

In contrast to the constraint imposed by this very limited course length c, and in view of the configuration of the collar of prior art collets (conicity of the order of 30°—that is, a vertex half-angle of the order of 15°—and an axial length greater than some 15 mm), the first problem described above, or first disadvantage, is now exposed.

The first problem is solved by means pertaining to the geometric configuration of the collar 2, which are explained further below.

The axial length of the collar 2, or collar root width 2 (indicated by the letter $\lambda$ in FIG. 3) is determined as a function of the axial course length c. Accordingly, this function is chosen so that the length $\lambda$ can be selected within an interval limited by approximately twice (lower limit) and five times (upper limit) the length of the axial course length c. Knowing that the usual values of such axial course lengths c of sleeves 20 extend within a range of approximately 1 mm to 3 mm, then the length $\lambda$ will be selected within a range extending between approximately 2 mm and 15 mm. Experience has shown that, according to the diameter for which the spring collet is intended, the axial length $\lambda$ of the collar 2 is advantageously chosen between 3 mm and 9 mm.

The conicity of the tapering surface 4 is dictated by the axial length $\lambda$ and by the diameter of the span 6 of the sleeve 20 at the intersection 2B of the tapering surface 4 with the sleeve 20, as seen in FIG. 3. There is a half-angle $\alpha$ and a generatrix line disposed within a plane passing through the axis 1A and supporting a segment 2A–2B, (the base of the cone of the collar 2 and the intersection 2B respectively). Experiments have shown that, in view of the range of diameters of the span 6 possibly enabled for construction, the selected angle $\alpha$ must always be greater than 15°.

Evidently, the more pronounced the conicity of the tapering surface 4, the closer the value of the axial length $\lambda$ will be to the lower limit associated with the axial course length c, and the greater will be the force that the piston 40 must exert on the collar 2 by means of the sleeve 20. As a result, the risk of causing damage to the collar 2 will increase. Therefore, the choice of the minimum value $\lambda$ and the maximum value of the angle $\alpha$ is limited by the constraint imposed by the characteristics of construction and constitution (material) of the collar 2. Experiments have shown that it is preferable for the angle $\alpha$ not to exceed 75°, whereas the prohibitive nature becomes stronger as the angle $\alpha$ approaches 90°. In compliance with the embodiment represented by FIGS. 1, 2 and 3, the angle $\alpha$ of the tapering surface 4 of the collar 2 is advantageously selected as 45°.

The profile of the tapering surface 4 of the collar 2 may be curved (profile 4A of FIG. 7), or curved with at least one flat portion (profile 4B of FIG. 8, the flat portion being shown by a line 4M). The overall slope of the surfaces 4A, 4B is indicated by the uniform reference generatrix line 4P, which supports the right hand segment 2A–2B (same references numbers as those indicated in FIG. 3), a generatrix which, together with the axis 1A, forms angles $\alpha_A$ and $\alpha_B$ respectively. Obviously, the corresponding face of the sleeve 20 (not shown in FIGS. 7 and 8) presents a similar matching profile for each case. This configuration has the advantage of a better distribution of the force exerted on the collar 2, whereas, in order to produce the same effect—that is, for the same opening of the clamping jaws 14; 15—the pressure necessary to be applied to the clamping jaws will be lower.

A second means, which can be combined with those described above, consists of increasing the number of grooves 11; 12. The determination of the maximum number of grooves depends on mechanical considerations concerning construction and/or manufacture. This increase will again enable a reduction of the force necessary to be applied to the collar 2 in order to obtain the same opening of the clamping jaws 14; 15. Measurements performed on the spring collets 1 provided with the means described above (even without increasing the number of grooves) have enabled the achievement of the following diameter differences between the open and the closed positions (by way of illustration only): 0.60 mm with a spring collet provided for the clamping of workpieces of 1 mm in diameter (maximum opening 1.60 mm), 1.25 mm with a spring collet for workpieces of 6.25 mm, and 3.00 mm with a spring collet for workpieces of 10.00 mm. Assuming a workpiece 10 (see FIGS. 1 and 2), with a clamping diameter 10A of 1.00 mm, 6.25 mm or 10.00 mm, then the diameters 10B, 10C can be as large as 1.60 mm, 7.50 mm or 13.00 mm respectively, without confronting the operator with any problem of a type which would require ancillary manipulations.

As to the second disadvantage, or second problem, it is solved according to an embodiment of the invention, through a modification of the geometry of the grooves (FIGS. 5 and 6). Generally, when the spring collet 1 is in the closed position (that is, when the workpiece is clamped), there remains a gap between the two mutually opposite faces (not shown) of each groove 11 (FIG. 3), and an increase of the clamping force remains possible. The modification described above is determined, in each particular case, as a function of the parameters detailed above (tubular workpiece, presence of threading, etc.). In other words, for an admissible—that is, pre-calculated—clamping force, taking into account the aforementioned parameters, the gap between the grooves: is corrected (see FIG. 5, where the spring collet is in the open position, and FIG. 6, where the spring collet is in the closed position). This correction consists of providing a gap $\epsilon$ over the groups 12, at least over a defined radial distance thereof (indicated as 12R on one of the three grooves in FIG. 5, the portions of groups 12R opening onto the variable axial opening 7 and partially onto the relief 8 (FIG. 3)). The gap $\epsilon$ is calculated so that, when the spring collet 1 is in the closed position (FIG. 6), and is thus exerting the predetermined clamping force on the workpiece 10 to be machined, then the mutually opposite faces of the portions of the grooves 12R abut against each other, thus making impossible any increase in clamping force. The workpiece 10 will thus be protected from any damage due to unintentional crushing.

It will be appreciated by persons skilled in the art, that the embodiments of the present invention are not limited to what has been particularly shown and described hereinabove. For example, the spring collet 1 may retain the workpiece 10, with any appropriate insert, or without the intermediary of any insert, and thus without the intermediary of a carbide insert 9. Rather, the scope of the present invention is defined by the appended claims and includes both combinations and subcombinations of the various features described hereinabove as well as variations and modifications thereof which would occur to persons skilled in the art upon reading the foregoing description.

The invention claimed is:

1. Spring collet for use within a spindle assembly of machine tools and automatic lathes configured for machining high-precision parts, wherein:
the spring collet has an axis and concentrically aligned thereto, a variable central axial opening adjustable to a first open position and to a second closed position, for respectively, releasing and clamping a workpiece, the spring collet having at least two grooves, where each one of the two grooves has two mutually opposite faces,
a collar extending concentrically outward from the spring collet, and having a tapering surface against which rests a corresponding face of a sleeve operable for translating forth and back along a limited axial course length c, to reversibly dispose the variable central axial opening, respectively, in the open and in the closed position, and
an axial length λ of the collar being retained within a length interval whose lower and upper limits are about, respectively, twice and five times the axial course length c, comprising:
the tapering surface being inclined by about 45° relative to the axis of the spring collet.

2. Spring collet according to claim 1, wherein:
the axial length λ of the collar is selected within an interval ranging between 2 mm and 15 mm, and
the length of the axial course c is retained between 1 mm and 3 mm.

3. Spring collet according to claim 1, wherein:
the axial length λ of the collar is selected within an interval ranging between 3 mm and 9 mm, and
the length of the axial course is retained between 1.5 mm and 1.8 mm.

4. Spring collet according to claim 1, wherein:
the tapering surface of the collar is inclined by 45° relative to the axis of the spring collet.

5. Spring collet according to claim 1, wherein:
the tapering surface of the collar has a profile that is selected from the group of profiles consisting of a curved profile, and an at least partially curved profile.

6. Spring collet according to claim 1 wherein:
the spring collet has two grooves.

7. Spring collet according to claim 1, wherein:
the tapering surface is inclined by 45°,
the variable central axial opening has a diameter, and
the difference in diameter between the open and the closed position of the variable central axial opening operative for machining high-precision parts is greater than 0.30 mm.

8. Spring collet according to claim 1, wherein:
at least a portion of two mutually opposite faces of the at least two grooves abut against each other when the spring collet is in the closed position and grips the workpiece with a predetermined clamping force.

9. Spring collet for use within a spindle assembly of machine tools and automatic lathes, configured for machining high-precision parts, wherein:
the spring collet has an axis and concentrically aligned thereto, a variable central axial opening adjustable to a first open position and to a second closed position, for respectively releasing and clamping a workpiece, and spring collet having at least two grooves, where each one of the two grooves has two mutually opposite faces, and
a collar extending concentrically outward from the spring collet, and having a tapering surface against which rests a corresponding face of a sleeve operable for translating forth and back along a limited axial course length, to reversibly dispose the variable central axial opening, respectively, in the open and in the closed position, comprising:
at least one portion of each one of the at least two grooves having a gap opening when the spring collet is in the open position,
at least a portion of two mutually opposite faces of the at least two grooves abut against each other when the spring collet is in the closed position and grips the workpiece with a predetermined clamping force, wherein
an axial length λ of the collar being retained within a length interval whose lower and upper limits are about, respectively, twice and five times the axial course length, and
the tapering surface being inclined by about 45° relative to the axis of the spring collet.

10. Spring collet according to claim 9, wherein:
the axial length λ of the collar is selected within an interval ranging between 2 mm and 15 mm, and
the length of the axial course is retained between, approximately 1 mm and 3 mm.

11. Spring collet according to claim 9, wherein:
the tapering surface is inclined by 45°,
the variable central axial opening has a diameter, and
the difference in diameter between the open and the closed position of the variable central axial opening operative for machining high precision parts is greater that 0.30 mm.

12. Spring collet according to claim 9, wherein:
the axial length λ of the collar is selected within an interval ranging between 3 mm and 9 mm, and
the length of the axial course is retained between 1.5 mm and 1.8 mm.

13. Spring collet according to claim 9, wherein:
the tapering surface of the collar is inclined by 45° relative to the axis of the spring collet.

14. Spring collet according to claim 9, wherein:
the tapering surface of the collar has a profile that is selected from the group of profiles consisting of a curved profile, and an at least partially curved profile.

15. Spring collet according to claim 9, wherein:
the spring collet has two grooves.

* * * * *